३,२३२,७३९
UREA-EXTENDED POLYURETHANE FOAM
Steven G. Belak, Claymont, Del., assignor to Sun Oil
 Company, Philadelphia, Pa., a corporation of New
 Jersey
No Drawing. Filed Oct. 12, 1962, Ser. No. 230,245
 1 Claim. (Cl. 71—28)

This application is a contination-in-part of application Serial No. 138,288, filed September 15, 1961, now abandoned.

This invention relates to polyurethane foams extended with free urea and to the process of making the same. The term free urea means urea which is not chemically bound in the foam.

In applying urea and other fertilizers to plants, it is difficult to regulate applications so that the fertilizer is maintained in the root area over the entire growing season. Heavy rains often wash the fertilizer away before it has achieved its maximum effect.

I have found that when free urea is incorporated in polyurethane foam, the urea is slowly released into the plant area over a long period of time by the leaching action of water. Plant feeding is extended over the entire growing season or longer and over-application of fertilizers—which can result in plant damage—is avoided.

Extended foams differ from impregnated foams in that the impregnants are added after the foam is formed. Extenders are added before the foam is formed. It has been proposed in the prior art to impregnate completed foams with various materials. In many instances, particularly in the case of rigid foams, the impregnating material does not penetrate deeply into the foam. I have found that a very complete and thorough dispersion is obtained when urea is added to the foam ingredients prior to the foaming step and further that the free-urea-containing foam has slow release properties assuring a constant supply of nitrogen to the soil. The extended foams of the invention provide superior results, as compared with impregnated foams, in that more nutritional benefit is obtained from the slow release of urea by leaching and greater plant growth is obtained using the extended foam rather than the impregnated foam.

Any conventional polyurethane foam can be employed as the foam component of this invention. Generally speaking density, cell size, foam height, etc., are not critical. Standard ingredients and foaming conditions are used. The techniques of making urethane foams are discussed by Barringer in HR-26, April 1958, E. I. du Pont de Nemours & Company, Wilmington 98, Delaware.

Polyurethane foams are made by reacting a diisocyanate with one or more polyols and water. The diisocyanate serves to join polyol molecules together, converting these liquid, low-molecular-weight polymers into very high-molecular-weight rubbery or rigid polymers. The final properties depend on the choice of polyol. For example, linear polyesters give rubbery polymers (flexible foams), and highly branched polyesters give hard, inelastic polymers (rigid foams). Any degree of cross-linking may be obtained in the final polymer by using polyesters having different degrees of branching. Water reacts with the di-isocyanate to provide gas for forming. In another well-known method of foaming, a blowing agent such as a halohydrocarbon is used instead of water. Both of these methods can be used in making the urea-extended foams of the invention.

A variety of organic polyisocyanates can be employed in producing the urea-extended foams of the invention, although aromatic di-isocyanates are generally used. Di-isocyanates include 2,4- and 2,6-toluene diisocyanates and mixtures thereof; 1,4- and 1,5-naphthalene diisocyanate; phenyl diisocyanates such as 4-4′-di-phenylmethane, p-dixylylmethane-4,4′-diisocyanate; and tri-isocyanates such as diphenyl-4,6,6′-tri-isocyanate. Side chain diisocyanates like naphthylylene and xylylene diisocyanates can be used.

Polyols having a molecular weight ranging from about 500 to about 10,000 are used as sources of active hydrogen. These include polyester amides, polyesters, polyethers, and polyglycol ethers. Examples are polyoxyalkylene glycols, sorbitol polyethers, polyisocyanate-modified polyoxyalkylene glycols, castor oil, hydrogenated castor oil, and blown soya oil. Desirable polyesters include the adipates, succinates, sebacates, and azelates of ethylene and propylene glycols formed by reaction with the appropriate acids. As mentioned above, linear polyesters produce soft foams; and branched polyesters produce hard foams while polyester blends provide various degrees of cross-linking.

It is the usual practice to employ a catalyst. Compounds such as bismuth nitrate, lead 2-ethylhexoate, lead benzoate, lead oleate, sodium trichlorophenate, tetrabutyl titanate, ferric chloride, stannous octoate, stannous oleate, butyltin trichloride, and tertiary amines such as triethylene diamine are suitable catalysts. The preferred catalyst is triethylene diamine.

An emulsifier or other surfactant is often added to the reaction mixture to enhance foaming. Examples are polyethylene glycol ricinoleate, sorbitan monolaurate, and sodium dioctyl sulfosuccinate. Silicone oils such as polyoxy-alkylene-polysiloxane copolymers can be used as well.

Any suitable form of urea can be used. It is available on the market in the form of industrial crystals, industrial prills, coated agricultural prills, uncoated agricultural prills, and feed compounds. Commercial urea contains from 40 to 50 per cent nitrogen.

The urea used in the following example had the following properties:

| | Percent |
|---|---|
| Nitrogen, $N_2$ | 46 |
| Biuret max | 0.25 |
| Biuret max | 0.25 |
| pH | 7.0–9.5 |
| Ash p.p.m. max | 30 |
| Free ammonia p.p.m. max | 30 |
| Melting point, °C. | 131.5–132.7 |

The urea can be added in amounts ranging from about 10 to about 60 weight percent based on the total foam ingredients. The optimum amount of urea is the maximum quantity of urea which can be added without seriously impairing the foaming reaction. This depends on the ingredients, including the blowing agent and the cell structure, density and other physical characteristics desired in the final foam. One skilled in the art can manipulate and control the ingredients and the foaming reaction to arrive at the most suitable urea extended foam. The final foam contains from about 5 to about 90% leachable urea, preferably 20 to 70%. It should be kept in mind that some proportion of the total urea is not leachable. This is believed to be due in part to a chemical reaction of some of the urea, i.e., 0.5–3% with the other ingredients during the foaming reaction and in part to the encapsulation of some of the urea in the cells of the foam. Urea trapped in the foam should eventually be released when the foam decomposes. This may take from 1 month to 5 years or more depending on conditions. In any case a major proportion of the urea is free and leachable.

The foam may be prepared by batch, semi-continuous or continuous methods using bench equipment, or commercial foam machines. In one method of processing, the urea and the polyol are mixed to form a first component. The catalyst, emulsifier, and water are mixed to form a second component. The two components are mixed together, and the di-isocyanate is added, and the entire mixture is placed in the mold. Foaming begins immediately and proceeds without further treatment. The foam is allowed to cure for a time ranging from 10 minutes to several hours. In another method of processing, the polyol and the di-isocyanate are reacted to form a prepolymer, and the latter is mixed with the urea to form the first component. The second component is made by mixing additional polyol, the catalyst, the emulsifier, and a halohydrocarbon blowing agent such as $CCl_3F$, $CCl_2F$–$CCl_2F$, or $C_2Cl_2F_3$. When the two components are mixed together, foaming begins and proceeds without further treatment.

Pressures ranging from 0.1 to 10 atmospheres and temperatures ranging from 40 to 200° F. may be used in the foaming step.

The following example illustrates an embodiment of the invention, but the invention is not to be considered limited thereto.

A urea-extended polyurethane foam was prepared in the following manner: In forming the first or "A" component, the urea is mixed with a prepolymer of polyether "G–2410" and toluene di-isocyanate. Polyether "G–2410" (Atlas Powder Company) is a condensation product of sorbitol with propylene oxide having the following properties: hydroxyl No. 490, approximate viscosity — 10,000 (Hoeppler), theoretical molecular weight—760, and acid No. 0.30. The prepolymer is a polymerized mixture of 114.5 parts of polyether with 391.5 parts of 80–20 TDI (toluene diisocyanate). In making the foam, 20.00 parts of crystalline urea having the aforementioned properties was mixed with 42.62 parts of prepolymer. The second or "B" component was made by mixing 0.45 part of a surfactant-silicone oil "L–520" (Union Carbide), 0.35 part of a catalyst-triethylene diamine ("Dabco"—Houdry Process Corporation), 31.28 additional parts of polyether "G–2410", and 15.30 parts of a blowing agent-trichloromonofluoromethane.

The A and B components were mixed together for 20 seconds at about 60° F. and poured into a mold. The foam creamed well, and the volume was about equal to a blank containing no urea.

Foams containing varying amounts of urea were prepared in the manner set forth above. 5 gram samples of the foams were totally immersed in water to determine leaching effect. The foams were filtered and rinsed over the water and the water evaporated leaving the leached urea. The following results were observed:

| Percent urea in foam | Percent urea leached in 24 hours | Percent urea leached in 213 hours |
|---|---|---|
| 0.5 | 0.01 | 0.01 |
| 5.0 | 20.4 | 28.0 |
| 10.0 | 34.0 | 38.0 |
| 20.0 | 32.0 | 42.0 |

The above data show that no significant amount of urea can be leached from a foam containing less than about 5% urea—based on the total foam. Similar results are not observed with foams containing higher precentages of urea. Longer leaching times such as a complete growing season, weathering effects and soil effects will favorably effect the leaching process.

The urea-containing foam may be molded in any suitable shape for use in the field. A particularly suitable embodiment involves molding the foam in the shape of a hollow cone which may be elevated over the plant with the base up. The sides of the cone may be of any desired thickness, and the cone may be attached to a rod or other means for elevation at a suitable height over the plant. The body of the cone can contain holes for draining off excess water collected during heavy rains. The foam surfaces can be slit to promote the percolation of water into the foam.

The urea-extended foam may be of the flexible type and as such can be provided in rolls of suitable cross-section which can be unrolled along the rows. If desired, the foam can be bonded to a cloth or plastic tape backing for added strength.

In another embodiment the extended foam can be cut into small shapes such as one half to one inch cubes and cast on the ground near the plants. These can also be worked into the soil.

The invention is not limited to the use of urea alone but includes the use of urea in a mixed fertilizer, the only limitation being that the other components be compatible with the foam ingredients and susceptible to being leached from the foam by water. Thus the extended foam can provide nitrogen, phosphorus, potassium, calcium, magnesium, and sulfur to the plants. For example, a liquid fertilizer which is currently available on the market contains 15 percent total available nitrogen (organic nitrogen from urea—10 percent, nitrate nitrogen from potassium and calcium nitrates—5 percent), 15 percent available phosphoric acid from liquid phosphoric acid, and 15 percent water-soluble potash from potassium nitrate. This material is compatible with the foam ingredients of my invention and forms excellent fertilizer-extended foams. Suitable amounts of mixed fertilizer are the same as those given previously for urea.

It is within the scope of this invention to impregnate the urea-extended foam with additional urea to provide a relatively large initial supply of nitrogen to the soil and plants during the early part of the growing season when a heavy application of fertilizer is wanted.

The invention claimed is:

A plant-feeding composition comprising polyurethane foam extended with from about 10 to about 60 wt. percent, based on the total foam ingredients, of urea, a major proportion of said urea being free and leachable from the foam with water at ambient conditions.

References Cited by the Examiner
UNITED STATES PATENTS

| | | | |
|---|---|---|---|
| 2,625,471 | 1/1953 | Mowry et al. | 71—64 |
| 2,975,146 | 3/1961 | Rogers et al. | 260—2.5 |
| 2,988,441 | 6/1961 | Pruitt | 71—27 |
| 3,042,631 | 7/1962 | Stradskov | 260—25 |
| 3,082,074 | 3/1963 | Handley et al. | 71—27 |

DONALL H. SYLVESTER, *Primary Examiner.*

ANTHONY SCIAMANNA, *Examiner.*